United States Patent [19]
Rezanka et al.

[11] Patent Number: 5,570,118
[45] Date of Patent: *Oct. 29, 1996

[54] COLOR INK-JET PRINTING WITH FAST-AND-SLOW-DRYING INKS

[75] Inventors: Ivan Rezanka, Pittsford; John W. Lin, Webster; Gary R. Fague, Canandaigua; Lesley P. Dudek, Webster, all of N.Y.

[73] Assignee: Xerox Corporation, Stamford, Conn.

[ * ] Notice: The term of this patent shall not extend beyond the expiration date of Pat. No. 5,371,351.

[21] Appl. No.: 296,635

[22] Filed: Aug. 26, 1994

Related U.S. Application Data

[63] Continuation-in-part of Ser. No. 975,027, Nov. 12, 1992, Pat. No. 5,371,531.

[51] Int. Cl.$^6$ .................................................. B41J 2/21
[52] U.S. Cl. ........................... 347/43; 347/100; 347/102
[58] Field of Search .................................. 347/100, 102, 347/43

[56] References Cited

U.S. PATENT DOCUMENTS

| | | | |
|---|---|---|---|
| 4,234,775 | 11/1980 | Wolfberg et al. | 219/10.55 |
| 4,467,348 | 8/1984 | Fujii et al. | 358/78 |
| 4,599,627 | 7/1986 | Vollert | 346/140 R |
| 4,672,432 | 6/1987 | Sakurada et al. | 358/75 |
| 4,682,216 | 7/1987 | Sasaki et al. | 358/79 |
| 4,833,491 | 5/1989 | Rezanka | 346/140 R |
| 4,943,813 | 7/1990 | Palmer et al. | 346/1.1 |
| 4,952,942 | 8/1990 | Kanome et al. | 346/1.1 |
| 4,982,207 | 1/1991 | Tunmore et al. | 346/138 |
| 4,999,646 | 3/1991 | Trask | 346/11 |
| 5,124,719 | 6/1992 | Matsuzaki | 346/1.1 |
| 5,156,675 | 10/1992 | Breton et al. | 106/22 |
| 5,371,531 | 12/1994 | Rezanka et al. | 347/43 |

*Primary Examiner*—Benjamin R. Fuller
*Assistant Examiner*—L. Anderson
*Attorney, Agent, or Firm*—Tallam I. Nguti

[57] ABSTRACT

An apparatus for printing a multicolor image on a sheet movable along a sheet path in a process direction. The apparatus includes a first printhead mounted at a first location along the sheet path and containing a first type ink for printing a first portion of the image on the sheet in which the first type ink has a surface tension greater than 40 dynes/cm at room temperature. The apparatus also includes a set of secondary printheads mounted along the sheet path and separated a small gap from the first printhead. The set of secondary printheads each contains a secondary type ink for printing a secondary portion of the multicolor image on the sheet, and each of the secondary type ink has a surface tension less than 40 dynes/cm at room temperature.

30 Claims, 3 Drawing Sheets

COLOR INK-JET PRINTING WITH FAST-AND-SLOW-DRYING INKS

RELATED APPLICATIONS

This application is a continuation-in-part of U.S. patent application Ser. No. 07/975,027, filing date Nov. 12, 1992, entitled "Thermal Ink-Jet Printing with Fast- and Slow-Drying Inks," U.S. Pat. No. 5,371,531, incorporated herein by reference. This application also incorporates by reference U.S. patent application Ser. No. 08/226,582, filing date Apr. 12, 1994, entitled "Image Processing For Ink-Jet Printing With Fast- And Slow-Drying Inks", U.S. Pat. No. 5,550,569. Both Applications are commonly assigned to the same assignee hereof.

BACKGROUND OF THE INVENTION

This invention relates to ink-jet printing, and is more particularly concerned with color printing using a combination of slow- and fast-drying inks to produce high quality images without intercolor bleeding.

In existing thermal ink jet printing, the printhead typically comprises one or more ink ejectors, such as disclosed in U.S. Pat. No. 4,463,359, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a print sheet, such as a piece of paper. Because the droplet of ink is emitted only when the resistor is actuated, this type of thermal ink-jet printing is known as "drop-on-demand" printing. Other types of ink-jet printing, such as piezoelectric, continuous-stream, or acoustic, are also known, and are also applicable to the present invention.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swaths, much like a typewriter; alternatively, a printhead which consists of an array of ejectors and extends the full width of the print sheet may be passed once down the print sheet to give full-page images, in what is known as a "full-width array" (FWA) printer. When the printhead and the print sheet are moved relative to each other, imagewise digital data is used to selectively activate the thermal energy generators in the printhead over time so that the desired image will be created on the print sheet.

With ink-jet printing, it is also possible to create multicolor images on a print sheet. This type of printing may be used for full-color images, such as to reproduce a color photograph, or can be employed for "highlight" color, in which colored additions are made to a main portion of the image or text, which is typically black. In either case, the most common technique for color ink jet printing has been to sequentially image two or more colors, in separate printing steps, onto the single print sheet. This superimposition can be carried out in any number of ways. To take the example of a full-width apparatus printing black and one highlight color, an apparatus may print out the entire black portion of the desired highlight image on the sheet, and then recirculate the print sheet once again to image the highlight color portion of the image onto the same sheet from another printhead loaded with the colored ink; such a system has a serious disadvantage in the production of accurate registration of the composed images. Alternately, two printheads may be positioned very close to each other, and render the two portions of the image onto the print sheet almost simultaneously, although two different areas of the print sheet will be printed upon by the different printheads at the same time or with a small time lag. For a full-color process image, four types of ink (yellow, magenta, cyan, and black) are emitted from four separate printheads during printing as the print sheet is moved relative to them. Contouring of four-color images, e.g. for the reproduction of color photographs, are typically created by "superpixeling" or "dot-next-to-dot" (DND) techniques, in which each pixel of the image is created from three or more partially-overlapping spots of different colors, as described, for example, in U.S. Pat. No. 4,999,646.

In any ink-jet printing apparatus, but particularly in color-printing applications, a key concern is the rapid and efficient drying of the ink which has been placed on the print sheet by the printheads. If wet ink is allowed to remain on the print sheet for an appreciable length of time, the image is likely to smear as the print sheet continues on its path through the apparatus. In color ink jet printing situations, another important problem related to ink drying is known as "intercolor bleed." This is a bleeding of one color portion of the image into another portion of the neighboring image of different color. This becomes most apparent when black image is imaged immediately adjacent to an area printed with a color such as cyan, magenta, or yellow. In such a case, the black ink will be seen to bleed into the color area (e.g., cyan, magenta, and yellow) to create a conspicuous print defect. If a composite color is made in the color area (e.g. by combining cyan and magenta to make a shade of blue), the problem will be particularly acute because of the large amount of liquid on the sheet surface. The lighter colored ink will bleed into the black portions of the image as well, but bleeding in this direction will not be as noticeable.

To avoid the print defects caused by inefficient drying of ink on the substrate and intercolor bleed, one solution is to employ either "quick penetrating" inks or special printing techniques. The quick penetrating inks have rapid drying properties, and penetrate deeply into the paper fibers soon after their ejections onto the print sheet. It is intended that, in the color context, the ink of one color will have dried before the imaging of the next color in the printing process, which may mean that the ink will be expected to dry within a small fraction of a second. Another problem with quick-penetrating inks in plain paper printing is known as "feathering," in which the ink is absorbed into the paper so quickly that traces of the ink appear to "feather out" around the areas on the print sheet where the ink was intended to be placed. This print defect may be tolerable in certain full-color images, but is certainly unacceptable in the printing of high quality text.

Co-pending U.S. patent application No. 07/975,027 (now with allowed claims), filed Nov. 12, 1992, and entitled "Thermal Ink-Jet Printing With Fast- and Slow-Drying Inks," discloses an ink-jet printing apparatus in which the problems of bleeding or feathering are avoided by providing two black inks. A slow-drying black ink is used in some portions of the image and a relatively fast-drying black ink is used for other portions of the image. Basically, the slow-drying black ink is used where the black portion of the image does not abut areas printed with other colors of the sheet, such as in the text of a document. The fast-drying black ink is used in situations where the black ink is placed in close proximity to inks of other colors on the sheet, particularly in reproducing a color image or photograph. In a preferred embodiment of the invention, the slow-drying black ink is first placed by itself on the sheet, and then immediately thereafter heat is applied to the sheet to dry the relatively slow-drying ink. Only after the slow-drying ink has substantially dried on the sheet is the fast-drying black ink, along with the other comparably fast-drying colored inks, placed on the sheet. In this way, a compromise is effected, using a slow-drying, non-feathering black ink in text, where such feathering would be conspicuous, and then using the fast-drying black ink in situations where intercolor bleed with other abutting colors would be of concern.

Co-pending U.S. patent application No. 08/226,582 filed Apr. 12, 1994, discloses a method of printing a desired image based on digital data on a substrate. A subset of the digital data relating to a portion of the desired image is identified, wherein pixels associated with the digital data are of a predetermined spatial relationship with pixels intended to be of a different color as the pixels associated with the digital data. The subset of digital data is caused to activate a printhead adapted to emit ink of a first type. Data not of the subset of digital data is caused to activate a printhead adapted to emit ink of a second type, the ink of the first type being adapted to dry at a faster rate than the ink of the second type.

There is therefore still a need to provide an ink-jet color printing apparatus that includes printhead structures and electronic control subsystems for using fast- and slow-drying inks in advantageous manners to produce high quality black and multi-color images without intercolor bleeding. Some attempts to provide ink jet printers of the sort, for example, are further described below as references.

U.S. Pat. No. 4,234,775 discloses the concept of using applied microwave energy to remove moisture from a moving web.

U.S. Pat. No. 4,599,627 discloses an ink-jet printer which employs a writing fluid having two components. One component is located in a separate reservoir, which feeds into a second printhead which is disposed farther from the sheet than the first printhead. The second printhead is mounted on the same carriage with the printhead in an offset position, and ejects the second component onto locations on the medium corresponding to the printed characters made by the printhead. The use of two fluid components achieves a reduced drying time and eliminates clogging of the printhead.

U.S. Pat. No. 4,833,491 discloses a color ink-jet printer having an ink delivery system adapted for multicolor images. When a given printing mode, such as highlight color, is selected, ink supply systems associated with particular ink cartridges are purged and re-connected as needed to print particular colors.

U.S. Pat. No. 4,943,813 discloses various methods of using an ink-jet device for creating overhead transparencies. In order to avoid certain common problems associated with this process, the patent discloses techniques such as printing a first spot of color at a selected location in a first pass of an ink-jet printer, and printing a second spot of color at the same location in a second pass; printing alternate spots of color in successive scans; and printing alternate lines of color in successive passes.

U.S. Pat. No. 4,952,942 discloses a color ink-jet printing method using inks of two or more colors including yellow. Mixed color areas containing yellow are created by using a plurality of inks with different dye concentrations for at least one color, wherein the yellow ink is attached onto the recording medium always prior to attachment of other inks onto the medium.

U.S. Pat. No. 4,982,207 discloses a heater construction for an ink-jet printer having a rotary print platen for holding a print sheet. The platen heater includes a hollow shell having vacuum holes for sheet attachment. A heating foil is mounted in heat transfer relation with the interior of the shell and is coupled by brush contacts to an electrical power source.

U.S. Pat. No. 4,999,646 discloses a full-color ink-jet printing technique in which contoured four-color images, such as in color photographs, are created by "superpixeling" or "dot-next-to-dot" (DND) techniques, in which each pixel of the image is created from three or more partially-overlapping spots of different colors.

U.S. Pat. No. 5,124,719 discloses an ink composition including a first component, a second component having a higher melting point than the first component, and a colorant. During printing, the first component is intended to permeate into the recording medium. As the concentration of the first component decreases and the temperature of the ink cools, the second component with the colorant will solidify and the first component will act to fix the second component and colorant to the medium.

U.S. Pat. No. 4,682,216 discloses a method of forming a full-color image. When a black component of a color pictured data is smaller than a predetermined value, the black component is expressed by using the combination of three colored inks. When the black component is larger than the predetermined value, the black area is rendered by using alternately a black ink and the three color ink combination.

U.S. Pat. No. 4,467,348 Fujii et al. discloses a recording (printing) apparatus for printing on a sheet first with black ink (printhead 125B), then with red ink (printhead 125R) as the sheet is moved in a process direction R. An air fan 126, a means shown for drying the printed two color image, is mounted downstream of both the first printhead 125B and the second printhead 125R.

U.S. Pat. No. 4,672,432 Sakurada teaches a particular configuration of a multicolor ink jet printing apparatus for reproducing halftone color images in which each picture element is comprised of a plurality of dots or cells. Some of the picture elements may contain dots of different colors and optical densities. The apparatus of Sakurada includes a bunched up plurality of printheads some containing inks exhibiting high optical densities, and some containing inks exhibiting low optical densities. In printing, where there is more than one combination of ink colorants representing the density of a picture element, the colorant having the largest number of dots is selected for printing. More colorants of different densities are used for cyan and magenta inks, than are used for black and yellow inks.

U.S. Pat. No. 5,156,675 Breton et al., teaches particular compositions per se of fast-drying ink inks. Many such compositions per se are known in the art.

BRIEF DESCRIPTION OF THE DRAWINGS

Other aspects of the present invention will become apparent as the following description proceeds and upon reference to the drawings in which.

SUMMARY OF THE INVENTION

In accordance with one aspect of the present invention, there is provided an apparatus for printing a multicolor image on a sheet movable along a sheet path in a process direction. The apparatus includes a first printhead mounted at a first location along the sheet path and containing a first type ink for printing a first portion of the image on the sheet in which the first type ink has a surface tension greater than 40 dynes/cm at room temperature. The apparatus also includes a set of secondary printheads mounted along the sheet path and separated from the first printhead. The set of secondary printheads each contains a secondary type ink for printing a secondary portion of the multicolor image on the sheet, and each of the secondary type ink has a surface tension less than 40 dynes/cm at room temperature.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
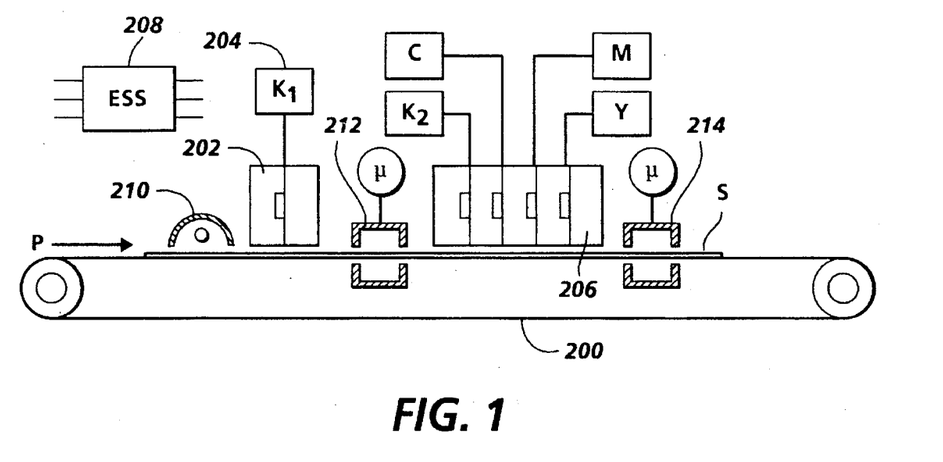
FIG. 1 is an elevational view showing the basic elements of a full-width thermal ink-jet color printer capable of emitting black inks of two types.

Referring now to the drawings, FIG. 1 is a simplified elevational view showing the basic elements of a stationary full-width array (FWA) thermal ink-jet printer incorporating the present invention. However, the invention as described below is also conceivably applicable to ink jet printers of the reciprocating printhead cartridge type. In a FWA printer, instead of causing relatively short printheads to reciprocate across a sheet moving in a process direction, relatively long full-width linear arrays of ejectors are provided which are stationary or have a fixed position relative to the width of the sheet, and thus each printhead extends across the entire width of a sheet on which an image is to be printed. In the view of FIG. 1, these linear arrays are shown end-on. Sheet S is caused to move in a process direction P by being placed on a belt 200, although other means for causing the motion of the sheet S relative to the printheads are known and can be used, such as placing the sheet S on a rotating drum or a reciprocating platen. A first full-width array printhead 202 is located at one point along the process direction of the sheet S, and is fed with ink of a preselected first type $K_1$ (an ink supply 204 adapted to emit a black. Somewhat downstream of printhead 202 is a set of printheads (black, cyan, magenta, and yellow printheads) generally indicated as 206. These printheads, in one embodiment of the invention, are each fed with ink of a primary color, as indicated by the letters C, M, and Y. In addition, one of the printheads in printhead set 206 is fed with a black ink indicated as $K_2$. The ink supply $K_2$ differs from the ink supply $K_1$ in ink supply 204, in that ink $K_2$ is of a different chemical composition so that it will be caused to dry relatively quicker than the "slow-drying" black ink $K_1$, for reasons which have been explained in detail above.

In addition to the full-width arrays of ejectors 202 and 206, there is also disposed along the path of the sheet S ink-drying means, which in this particular embodiment are shown as an infra-red lamp or a cavity for the transmission of microwave energy onto the sheet S, or a heated platen or a heated drum although once again other means for increasing the rate of evaporation on the sheet S may also be used. For illustration purposes, infrared lamp 210 is intended to convey infrared energy to the surface of the sheet S before printing by printhead 202. Optional microwave cavity 212 is operatively connected to a microwave source, and tuned to a frequency which will stimulate the liquid component of ink placed on the sheet S, thereby causing the ink penetration and evaporation thereof. The use of microwave energy may be less useful in initial paper heating, because microwave heating is more effective upon compiling the microwave with ink components, as would be found in liquid ink on the sheet. A further microwave cavity 214 may be provided for a final application of energy to the ink placed on the sheet S after the second printing step. (One of skill in the art if ink-jet printing will recognize that various types of heating devices, such as microwave or infra-red, may be combined in one apparatus, and also that the selection of which type of heating system is used will cause some ink compositions to become preferable to others, as different compositions may respond differently to, for example, microwave energy.)

Figure 2:
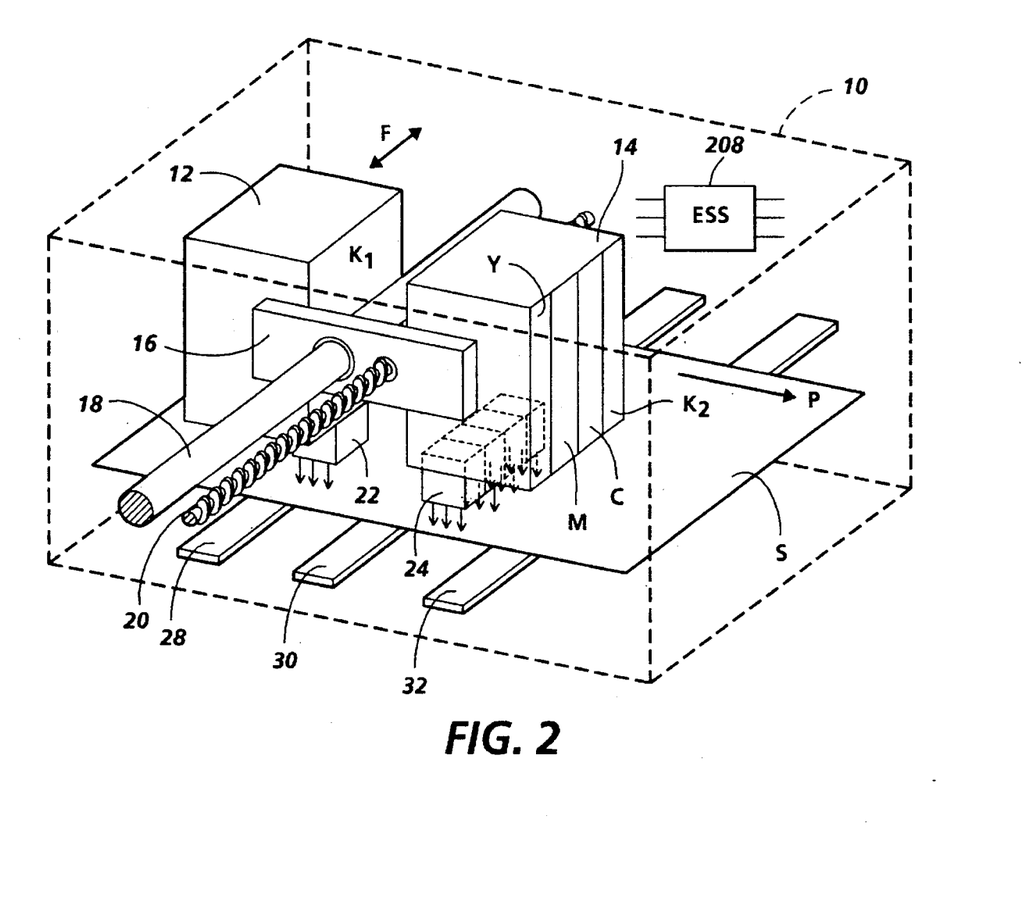
FIG. 2 is an elevational view of a swath-printing ink-jet printer incorporating the present invention.

FIG. 2 is a simplified elevational view of the relevant portion of a drop-on-demand thermal ink-jet printer, generally indicated by housing 10. A sheet S, a recording medium for the creation of an image thereon, is caused to move through the printer in process direction P. The means for causing the motion of the sheet S through process direction P will be apparent to one skilled in the art, such as rollers, moving belts, or a reciprocable platen. As sheet S moves through process direction P, it passes a printhead station comprising, in this embodiment, a first printhead cartridge 12, and a second printhead cartridge 14, which are together mounted on a carriage 16 for preferably unison motion relative to the sheet S. The carriage 16 is mounted within housing 10 in such a way that the printhead cartridges 12 and 14 may be caused to reciprocate relative to the sheet S in a fast-scan direction, indicated as F, which is preferably transverse to the process direction P. In order to carry out this motion, carriage 16 may be mounted on a guide rail 18, and also engaged with a lead screw 20, as shown. In this particular embodiment, lead screw 20 is double threaded, to create a back-and-forth motion of carriage 16 as a tooth on carriage 16 (not shown) engages with the threads of lead screw 20, which is rotated by means not shown. Alternatively, cartridges 12 and 14 are mounted on a shaft and they can be moved in a transverse direction to P by a wire wound on a motorized roller. Various related and other schemes for causing the reciprocating motion of carriage 16 in a fast-scan direction relative to the sheet S are familiar to the art of ink-jet printers, and any known method may be employed to create this scanning motion. Each printhead cartridge 12, 14 mounted on carriage 16 includes an ink supply and a drop-on demand ink-jet printhead operatively connected thereto. Typically, a printhead cartridge such as 12 or 14 will be intended to be removable and in the form of a customer-replaceable unit, or CRU. When the ink supply within a cartridge is exhausted, it is typically intended that the entire cartridge and printhead be replaced. Numerous designs for such a printhead cartridge are known in the art and currently commercially available.

Preferably, the printhead cartridge 12 is disposed upstream, in the process direction, of printhead cartridge 14. Printhead cartridge 12 includes a main body which forms the container for the ink supply, and extending therefrom toward the sheet S is a printhead 22. The ink supply preferably contains a slow-drying black ink, indicated in the figure as $K_1$, the function of which will be described in detail below. The printhead 22 may be of a form typically known in the art, such as comprising a linear array of drop-on-demand thermal ink-jet ejectors, typically spaced 300, 400 or 600 to the inch and numbering, in such a printhead, 128 ejectors in the array. Image-processing means (not shown) are used to operate the ejectors, in known manner, to cause the ejectors to emit ink in imagewise fashion as the printhead is caused to move relative to a particular location on the sheet S.

Printhead cartridge 14 is generally similar in operation to the printhead cartridge 12, except that, in this embodiment, printhead cartridge 14 comprises multiple ink supply chambers and multiple printheads. In this embodiment, printhead cartridge 14 is subdivided into three separate ink supplies, indicated as shown as the primary colors, cyan, magenta, and yellow, or C, M, Y, respectively. Further, the printhead cartridge 14 may include a fast-drying black, indicated as $K_2$, to be applied in the second step. Such a process black is typically intended for full-color images, such as color photographs and pictorial images, wherein black is intended to blend visually with neighboring colored areas. The process black in the second step should preferably have a drying time comparable to that of the other color inks in the second step, and shorter drying time than the black applied by printhead cartridge 12 in the first step, as will be explained in greater detail below. Each ink supply C, M, Y, and $K_2$ is in communication with its own dedicated linear array of ejectors which are preferably placed in close proximity to one another in printhead 24. The arrows shown emanating from printhead 24 indicate an example that four separate linear arrays are operating to place droplets of ink on the sheet S.

With the apparatus shown in FIG. 2, it will be appreciated that, when a sheet S is caused to move in process direction P through the apparatus, the printhead cartridges 12 and 14 mounted on carriage 16 will be caused to move back and forth in a fast scan transverse direction F while the ejectors within the respective printheads thereof create images on the sheet S. It will further be appreciated that, as printhead cartridge 12 is operatively disposed upstream of printhead cartridge 14, that, relative to a particular location on the sheet S, a portion of an image created with printhead cartridge 12 will be placed on the sheet S earlier in time than the image created by printhead cartridge 14 on an adjacent, or substantially the same, location on the sheet. There will thus be a time lag between the ejection of ink from printhead cartridge 12 on a particular location and the ejection of ink from printhead cartridge 14 to the generally same or adjacent location. A typical duration of the printing of a swath in an ink-jet printer is between 0.2 and 2 seconds. Typically, printhead cartridge 12 will be at least one or two swaths "ahead" of printhead cartridge 14. It is this time lag between the printing of the swaths which enables a key function of the present invention, as will be explained below.

Also included in the printer of FIG. 2 is a set of paper-heating means, generally shown as elements 28, 30, and 32. As can be seen in the illustration, element 28 is disposed just upstream of printhead 22 of printhead cartridge 12, while element 30 is disposed, in the process direction, between printhead 22 of printhead cartridge 12 and printhead 24 of printhead cartridge 14. Element 32 is located after the cartridge 14 and printhead 24 in the down stream of imaging process. Elements 28, 30 and 32 are simply shown as areas of applied heat, as would be possible with, for example an area of electrical resistance, or an infrared heater, but any kind of known means for heating a controlled area of a paper sheet may be used, such as radiant microwave or forced hot air convection or heating with applied vacuum. Although the elements 28, 30 and 32 are shown in the drawing as applied to the non-image side of sheet S, for various purposes it may be preferred, as needed, it is also possible to cause the sheet S to be heated from the image side, in which case elements 28, 30, and 32 whatever their actual combination, would be disposed on the image side of sheet S. If the heating elements are placed below the sheets, then elements 28, 30, and 32 can be combined into a single continuous heating device. The purpose of applying heat to the sheet S in either position, either before the application of ink from printhead 22 or between the applications of ink from printheads 22 and 24, and thereafter, is to increase the rate of drying of ink placed on the sheet. These drying means simply introduce heat into the system in order to increase ink penetrate rate into the recording substrate, moisture removal and the rate of evaporation of ink placed on the sheet. If the sheet S is heated before the application of any ink, there is intended to be at least some excess heat energy remaining in the paper by the time ink from one printhead (i.e., No. 22) contacts the sheet. In the case of element 30, the heat transferred therefrom into sheet S may be used directly for increasing the ink penetration into the recording substrate from printheads 24 and the rate of drying of ink emitted onto the sheet from printhead 22. The element 32 is employed to further increase the drying of various inks after the complete imaging process. In this invention, high quality color images including graphics and texts can be obtained with high optical density, sharp images, high resolution, and without inter-color bleeding on plain paper and coated papers.

Figure 3:
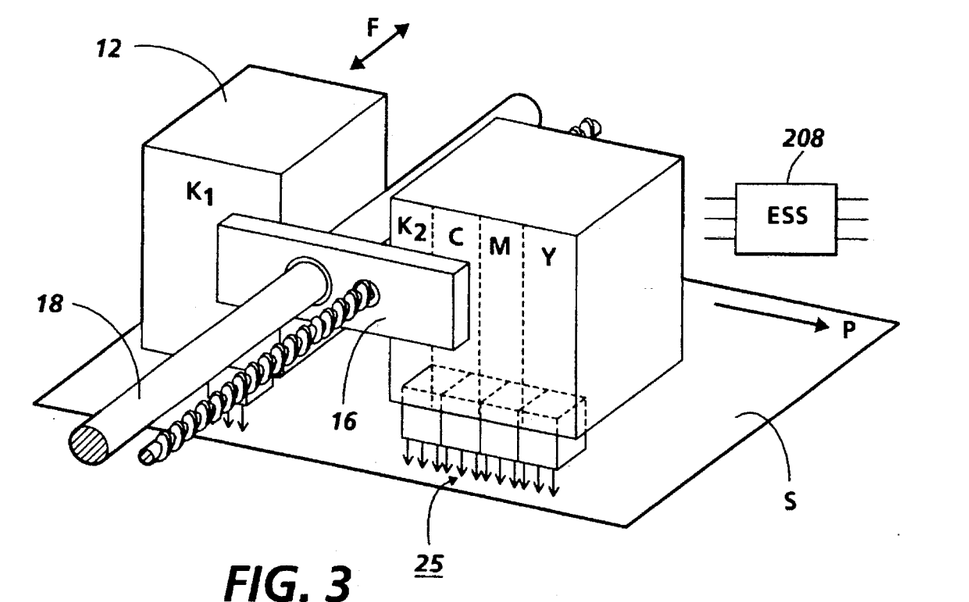
FIG. 3 is an elevational view of another embodiment of a swath-printing ink-jet printer incorporating the present invention.

FIG. 3 shows an alternate swath-printing embodiment of the present invention, wherein the fast-drying color inks of the second step are emitted from printhead cartridge 15. The printhead cartridge 15 of FIG. 3 is similar in function to the printhead cartridge 14 in FIG. 1, however, the separate printheads for each of the fast-drying colors are disposed transverse to the fast-scan direction F in such a manner that with each swath printed as the carriage 16 moves along guide rail 18, each one of the separate printheads 25 (cyan, magenta, yellow, and black printheads) effectively prints a separate swath of color images on the sheet S. This separation of each color in its own swath as it is printed allows for even further time delays between the superimposition of different colors on the sheet S. This arrangement allows an advantage over the arrangement of FIG. 2 in that the separate swaths for each colored ink will permit printing to take place in either direction of motion of the printhead (left to right or right to left direction). In the arrangement of FIG.

2, it is preferred that it operate in a uni-directional mode, because the order of colored inks placed on a sheet will have a subtle but possibly noticeable effect on the hue of inks blended on the sheet. In the FIG. 3 embodiment, however, the order of inks will be the same regardless of the direction of the carriage 16 (left to right or right to left) for a particular swath.

Figure 4:
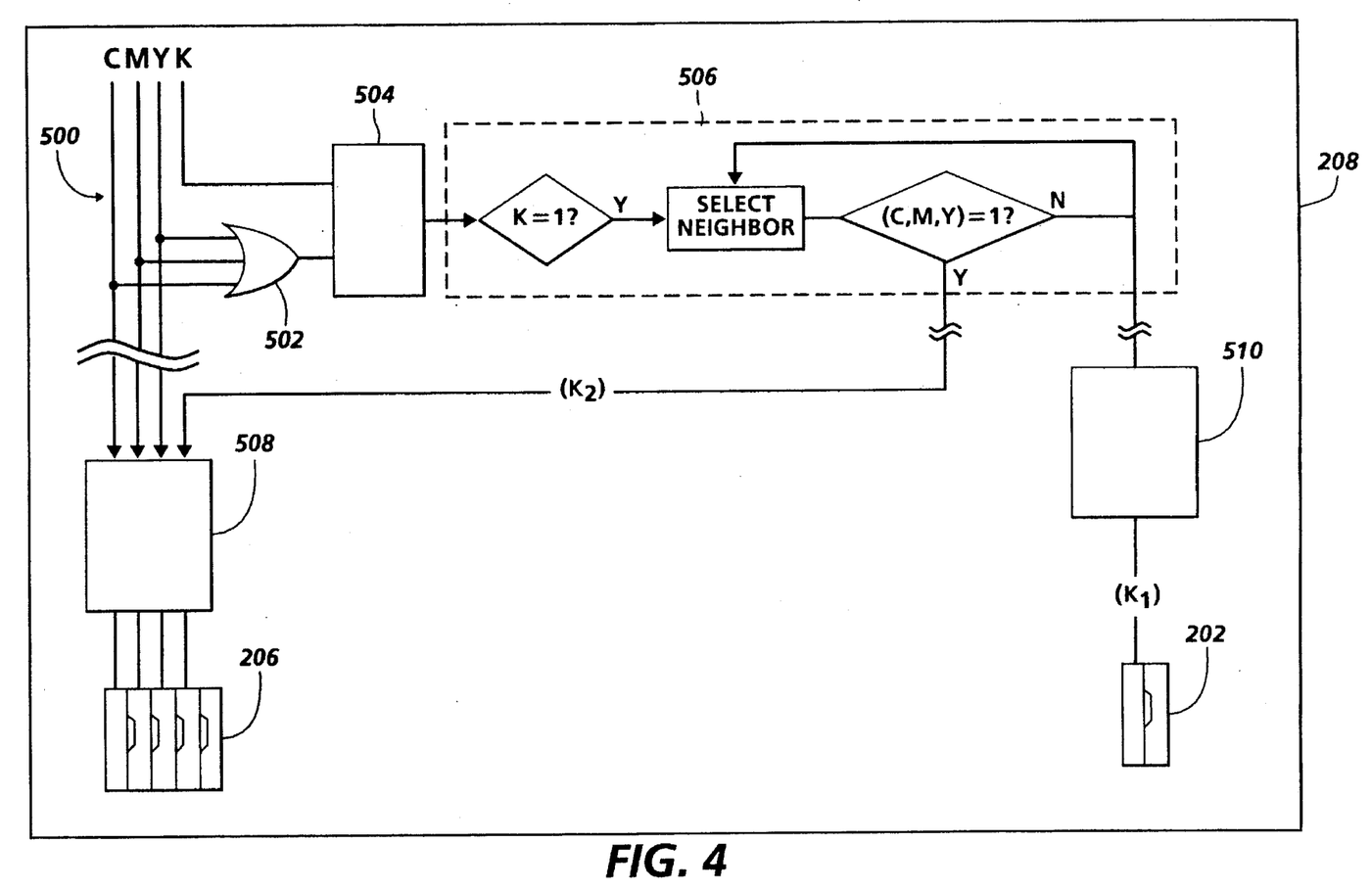
FIG. 4 is a schematic of an electronic subsystem control diagram for controlling all the subcomponents and functions, and for discriminating among types and colors of multicolor images according to the present invention.

FIG. 4 is a simplified illustration of the electronic control subsystem ESS 208 of the present invention as shown in the embodiments of FIGS. 1, 2, and 3. The ESS 208 will be described herein with reference to FIG. 1. However, it is understood that its capabilities and connections as described with reference to FIG. 1, are equally applicable with reference to FIG. 2 and to FIG. 3. As is well known, the ESS 208 is programmable, and is connected within the ink jet printer, or simply printer 10 for controlling the functioning of all subcomponents of the printer, particularly the selective operation of the printheads. As illustrated, ESS 208 includes means for discriminating between different types of ink within an image in order to then select a printhead or sets of nozzles or ejectors of a printhead having the preferred type of ink for a given portion of the image to be printed. It will be noted in FIG. 4 that four data lines 500, marked C, M, Y, and K, are provided for carrying pixel data streams. As shown, the lines are connected individually to the printheads, 202, and 206 FIG. 1. That is, they are connected to either printhead 202 emitting the slow-drying black ink, $K_1$, or to the set of printheads 206 emitting the fast-drying black ink, $K_2$ or the colored inks (Cyan, Magenta, Yellow). Starting with the four data streams, the line carrying the pixel streams for the C, M, and Y separations of the image to be printed are conveyed more or less directly to the set of printheads 206 to operate the ejectors therein. The ESS 208 also includes any number of buffers and timers associated with these lines 500 which serve to coordinate the application of image data to the set of printheads 206 with the behavior of a print sheet passing therethrough, so that the different color separations corresponding to each type of ink are placed on the sheet in a coherent manner.

In addition, the ESS 208 includes means, for example an OR gate, 502 for sensing the presence of colored portions of an image as the image data for such portions enter the printer. It will be understood to one familiar with the art of digital systems, that any number of digital arrangements, such as shift registers or software applications, could function as an equivalent to this OR gate 502. Simultaneous with the entry of the color data CMY into the system, there will of course be a quantity of data intended to be printed in black in the printer. As such, the line K carrying such data does not directly feed to the set of printheads 206, as do the CMY lines, but instead is fed into a data buffer 504. It will also be noted that also fed or loaded into data buffer 504 is the output of the OR gate 502. There will thus be loaded into buffer 504 not only information relating to the location of black (K) pixels in the desired image, but also information relating to whether pixels of any other color are forming part of the desired image. Generally, for purposes of the present invention in this embodiment, the exact identity of colors for this analysis is not necessary, and therefore the OR gate 502 will be sensitive to any color. The advantage of funneling the color data CMY into one line out of OR gate 502 is that less data need be processed. Therefore, fewer data need be processed by the system, and therefore the system can work appreciably faster.

The buffer 504 temporarily stores image data in a first in first out (FIFO) manner so that an individual pixel datum may be analyzed by a comparison with its immediate neighbors. Because ink-jet printing is a binary process (i.e., for a given pixel location within a desired image, there will either be the emission of an ink droplet or not) the data ultimately transmitted to the printheads 202 and 206 will be in the form of strings of pixels, each byte in the string being a 1 or 0 depending on whether that particular location in the desired image is to receive ink of any color. In the convention used in this description, the number "1" indicates that the particular location will receive a droplet of ink from a printhead, and "0" indicates that no ink of a particular color will be emitted thereon. However, because this is a full-color system, the droplet of ink will be of one selected primary color; in a full-color system, non-primary hues are created by placing pixels of primary colors adjacent each other on the sheet in various proportions, allowing the observer's eye to blend the pixels of primary colors together. A key function of the ESS 208 is to identify locations on the final desired image where black pixels abut contact, or are within a predetermined distance range from, locations of color pixels. Where the black pixel area is within a certain distance from the color pixel area, the system will chose a fast-drying ink. Where the black pixel is within a certain distance of only other black pixels or areas where no ink is to be emitted, the system will chose the slow-drying black ink.

The ESS 208 further includes an "analyzer" indicated as 506 which is here represented as containing a flowchart of the analyzing function carried out by the analyzer. The analyzer can be embodied in hardware or software, as would be apparent to one of skill in the art, and is defined by the flowchart indicated in FIG. 4. There is entered into analyzer 506 two species of information: whether a droplet of ink will be emitted for that particular pixel location, and whether that emitted droplet will be black or of another color. This information is received in buffer 504, which stores a quantity of pixel data for a given time, because, as will be noted below, the analysis will require examination of pixel data both previous to and after the pixel datum actually being considered at a given moment. When a given pixel datum is entered into analyzer 506, the first inquiry is whether the particular pixel is intended to be a black droplet, this inquiry being indicated by the shorthand K=1. If the answer to this inquiry is yes, the analysis proceeds to the next stage. If the answer to this inquiry is no, this means either that there will be no ink of any kind emitted for that pixel location, or that the ink will be a colored ink, in which case such information will be going to printhead 206 anyway.

The next step in the analysis is to examine a plurality of neighboring pixels around the pixel in question. The idea of a "neighboring pixel" can be defined in any number of ways, depending on the specific design of the printer, and the specific requirements of print quality and speed. In general, it may be said that a neighboring pixel will be one of a preselected plurality of pixels around the pixel in question, either directly abutting the pixel in question, or a preselected number of pixel locations away from the pixel in question. As shown in FIG. 4, once a neighbor is selected, the inquiry is whether the neighbor is a color pixel, shown by the shorthand C, M, Y=1. If the answer is yes, then the black pixel in question will be sufficiently close to a colored pixel that intercolor bleeding will be a problem, and therefore the fast drying ink $K_2$ will be required as shown. If, after testing a preselected number of neighboring pixels, it is determined that all of the neighboring pixels are either black or blank (no ink of any kind), then a slow-drying black ink $K_1$ from printhead 202 may be used. As may be expected, the effect of this analysis will be to select the fast-drying black ink in situations such as reproducing color images, wherein black areas are directly abutting colored areas, while pure black areas, such as in text, are printed with slow-drying black ink.

Having explained the basic necessary physical elements of the present invention, discussion will now turn to practical aspects of two-step creation of images on a sheet S according to the present invention. A key principle of the present invention is that ink placed on the sheet S in an imagewise fashion in the first step of the printing process, that is, by the first printhead 202, 22 or 42 in the embodiments of FIGS. 1, 2 and 3, will be done with a relatively slow-drying first black ink $K_1$, which is then permitted to substantially dry in an intervening step aided by drying means 212, 30, for example, before application of ink from the second set of printheads 206, 24 25, FIGS. 1 to 3, respectively. According to the present invention, the ink applied to the sheet S in the second step is generally of a composition that will dry faster than the ink applied in the first step. As mentioned above, a key print quality defect in the printing of full-color ink-jet images is intercolor bleeding, caused by the undesired mixing when inks of two separate colors are printed next to each other. The intercolor bleeding problem is most serious with slow drying black ink, both because of the dominance of black ink in printing text and graphics, and also because slow drying black ink, by its very color and high optical density, will conspicuously interfere with any other kind of color ink. The two-step technique enabled by the present invention is most advantageously used in printing a relatively slow-drying black ink in the desired location of the image in the first step, and then allowing the slow-drying black ink to dry substantially or completely on the imaging surface, and then printing the remaining colors in the desired locations.

A "slow-drying" ink is typically defined as having a drying time of more than 1 second at room temperature, while a "fast-drying" ink is defined as capable of drying to a satisfactory extent in less than 1.0 second. The slow drying ink usually has a surface tension greater than 40 dyne/cm and the fast drying type ink has a surface tension less than 40 dyne/cm at room temperature. Because most customer's printing jobs involve the printing of both black text and a full-color graphic on the same sheet, the slow-drying ink is preferably used to print all text. The slow-drying black ink usually does not penetrate into the paper sheet quickly, and also tends to mix with neighboring color ink to create the undesired intercolor bleeding. However, the slow-drying ink can generate text with sharp edges which can not be easily produced by the fast-drying inks. By printing the slow-drying black ink first, the slow-drying black ink is allowed more time to penetrate into the paper to substantially avoid the intercolor bleeding problem.

It should be noted that all liquid inks, like any liquid, each have a "surface tension" characteristic. The surface tension of an ink as such varies with the chemical nature of the ink. Surface tension depends on the type and concentration of surfactants and solvents contained in the ink. It results from attractive forces exerted by molecules below the surface upon moles at the air interface surface of the liquid ink. These forces create an inward pull or internal pressure in the liquid ink which then tends to restrain the liquid ink from flowing.

When printing with liquid inks on plain paper, high surface tension liquid inks penetrate into the surface of the paper very slowly, and are therefore termed slow-drying inks. Slow-drying inks, in general, give images with sharp line edges. Low surface tension inks on the other hand, penetrate into the paper surface very quickly and are therefore termed fast-drying inks. These fast-drying inks also "bloom" which means that the ink spreads outward slightly as it penetrates downward into the paper. This yields images which are not as sharp at the edges as those made with slow-drying inks, but which can be handled more quickly without smudging or without the ink being rubbed off. For monochrome printing, highest print quality is achieved using slow-drying ink, especially for text documents and line drawings. For multi-color printing the situation is more complicated. When two slow-drying liquid inks are placed directly adjacent to each other on a surface, intermixing of the inks occurs causing severe degradation of the print quality, a defect termed intercolor bleed. If only inks which have sufficiently low surface tension are used, prints or images with markedly reduced intercolor bleed will be obtained, but such prints will have poor quality due to the "bloom" effect, for example.

Ordinarily, full-color printing requires four colors of ink: black, cyan, magenta and yellow. Since high-definition printing is particularly important for text and line drawings and since these are normally printed in black, Applicants' ink jet printer has been provided with five printhead cartridges. Four of these cartridges contain fast-drying black, cyan, magenta and yellow inks to be used for multicolor printing, and the fifth contains the slow-drying black ink for printing text, line drawings and black portions of images.

The method of the present invention for printing high quality multicolor images without intercolor bleeding includes printing a first portion having sharp edges with a slow-dry ink having a preferred surface tension greater than 40 dynes/cm. The method then includes printing an abutting color portion in contact with the first portion using a second type ink having a preferred surface tension of less than 40 dynes/cm, so as to prevent the second type ink from bleeding into the first type ink. The method may further include a step of heating the first portion, using a heating means mounted in the gap between the first and secondary printhead cartridges, prior to printing the second abutting portion.

Another process parameter which has a substantial effect on print quality is the amount of ink per drop placed on the sheet with every emission of ink from any printhead. In general, the more ink placed on the sheet, the greater the likelihood that intercolor bleeding will occur. It has been found that, preferably, the amount of ink emitted by each nozzle when disposed near a particular location on the sheet S be less than 150 picoliters in a printer having a resolution of 300 spots per inch (spi). Further, it has been found that, particularly in the case of creating images from artificially-made graphics documents (such as computer-created screens and charts, as opposed to color photographs) that intercolor bleeding can be reduced by reducing the drop volume of ink per ejection to locations on the sheet wherein an area of one color abuts an area of a different color.

Figure 5A:
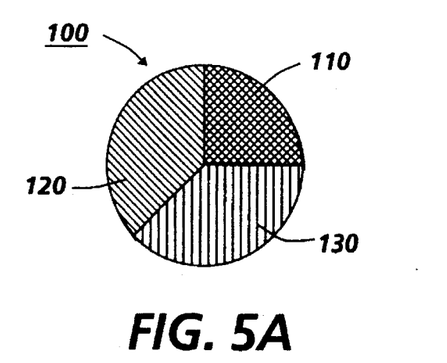
FIGS. 5A, 5B, and 5C represent examples of multicolor images shown in pie-chart form only as examples, and illustrating the "pixel gapping" and "gap" filling printing methods according to the present invention.
Figure 5B:
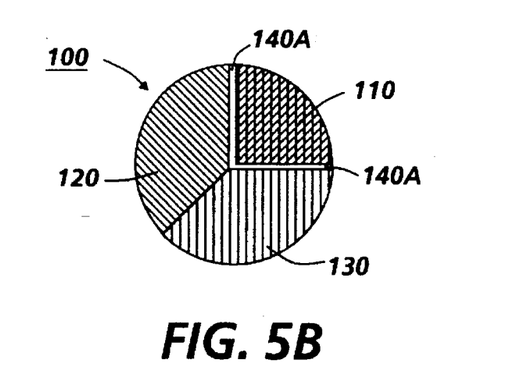
Figure 5C:
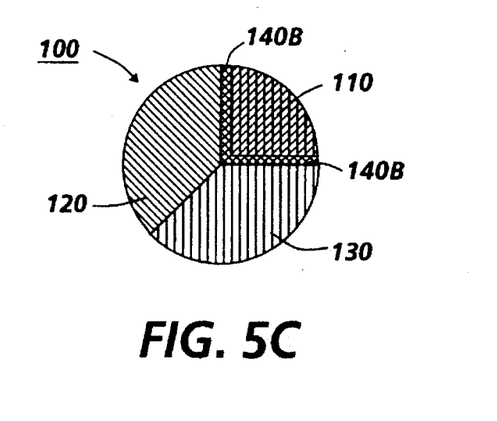

Referring now to FIGS. 5A, 5B, and 5C, the method of the present invention is illustrated in FIGS. 5A to 5C. FIG. 5A represents an example image shown in a pie-chart form, in which, for the sake of illustration, one portion 110 is to be printed with slow drying, high quality black ink, and the other portions 120 and 130 for example are to be printed, as part of the second step using different color inks. A technique of the present invention for the avoidance of intercolor bleeding can be called "pixel gapping" and requires the ESS to analyze the image data to determine the locations on the image where the color of the ink in the first printing step abuts or would otherwise contact the color ink of a color portion to be printed subsequent thereto. Typically, as in a printed pie-chart, the borders between the two different colored areas in the chart are likely locations for serious intercolor bleeding. One technique that has been found successful in avoiding intercolor bleeding in artificially-made graphic images is to intentionally create gaps of color near the lines of abutment in the image. That is, for the outermost rows of pixels for any colored area, a deliberate "white gap" of blank pixels may be created, thereby allowing a border of white space between abutting colored areas and therefore reducing or eliminating intercolor bleeding. Ideally, the white gap should be large enough to avoid the touching of two neighboring ink areas through ink spreading, but small enough to prevent the formation of noticeable, undesirably large gaps. The number of necessary pixels to be removed to create the proper-sized gaps may be determined experimentally, and may vary by the types of inks and substrates used in the printing. A white gap of not more than three pixels in a 300 spi image, or between 2 mils and 15 mils on the sheet, is preferred.

FIG. 5B shows an exaggerated illustration of the technique of "pixel gapping" by which a is gap 140A is deliberately created along a line where the slow drying ink portion would contact or abut the color portions. The gap 140A preferably is between 2 mils and 15 mils mode. When this gap 140A is less than 15 mils in width, however, it will be considerably less conspicuous, yet it will still be wide enough to prevent interaction between the slow-drying black ink of the black portion and the other colored portions printed with a fast-drying ink.

A variation of "pixel gapping" involves filling the created gap 140B between the slow drying black ink $k_1$ portion and any other color portion using the fast drying second black ink $k_2$. Therefore, in the case where slow-drying black ink $k_1$ is printed in the first step, and the colors as well as the fast-drying black ink $k_2$ are printed in the second step, areas 140B where the first black ink $k_1$ would otherwise contact abutting colored ink portions should be printed in fast-drying black ink $k_2$. Non-abutting black areas, particularly text, should be printed in slow-drying black ink. Indeed, an image may be so processed that, in a solid black area on the image, the border areas thereof (for example the outermost 1/10 of an inch around the area) may be selected to be printed in fast-drying ink, with the internal black remaining area in slow-drying ink. FIG. 5C gives an exaggerated view of how the outer border of the black portion, or created gap of FIG. 5B may be printed In this way, slow-drying black ink will not abut or contact fast-drying ink in the image, except for fast-drying ink of the same color (e.g. black).

When drying means for heating the sheet in the course of the creation of an image thereon is employed, print quality may be caused to improve significantly, particularly with plain, uncoated paper. As mentioned above, this heating may take place either before any image is created on the sheet, or between the creation of the first and second partial images, or both, as well as after the completion of printing desired images, for a variety of reasons. First, heating of the paper and ink in the printing of color images in the imaging steps will enhance the rate of the ink penetration and evaporation of the solvent (usually water) of the inks before the inks can mix together on the sheet. Second, the heating of the sheet and image can accelerate the penetration of the ink into the paper. Third, if the temperature of the ink on the sheet is higher than room temperature due to the heat treatment, then the ink viscosity will be lower, thus, facilitating the speed of ink being absorbed into the paper. Fourth, if a chemical reaction for immobilization of the colorants in the ink in the second step takes place, the reaction rate will be increased due to the increase in temperature. Fifth, the use of heat treatment of the sheet can also reduce the degree of cockle, which often occurs in printing water-based inks on plain papers and transparencies. Although heating can be applied at different locating, in a practical ink-jet printer, it is preferred to apply the heat treatment only within a relatively small area near the imaging zone in the vicinity of various printheads, for reasons of efficiency and lower energy consumption.

It has been found that the delay time between printing two color images adjacent to each other on a sheet is a key factor in ultimate production of excellent print quality. On a typical letterhead bond paper without heat treatment, a delay of 10–15 seconds is preferred in order to completely eliminate intercolor bleeding. For better plain papers (such as smooth but uncoated papers), a time delay from 3.0 to 10 seconds between printing steps is found to be suitable at room temperature, and this delay time may be decreased by heating of the paper during the printing process. The shorter time delay afforded by paper heating will not only serve to increase the maximum possible rate of printing (in terms of sheets per minute) of a given printer design, it will also permit the locations of printheads for the two printing steps to be made closer together, thus allowing a smaller "footprint" for the apparatus.

Many inks can be used in this invention. In the preferred embodiment of the present invention, the following types of ink for various colors have been found to be satisfactory. The following list is intended to provide a non-exclusive list of possible inks for one illustration purpose.

| SLOW-DRYING BLACK INKS | |
| --- | --- |
| 1. 6–20% | BASF X-34 (30% Concentrated dye liquid) |
| 2–6% | Pure dye mixture |
| 10–45% | Ethylene glycol |
| 1–5% | Isopropanol |
| 0.01–1.0% | Polyethyleneoxide (M.W = 18.5K) |
| Balance | distilled water |
| 1.2 micron filtration | |
| 2. 2–7% | Carbon Black |
| 1–40% | Ethylene glycol |
| 0–20% | N-Methylpyrrolidinone |
| 0.2–10% | Lomar D (Henkel) |
| 0–1.0% | Duponol (Sodium Lauryl Sulfate) |
| 0.01–1.0% | Dowicil 200 (Fungicide, Dow Chemical Co.) |
| Balance | distilled water |
| 1.2 micron filtration | |
| 3. 2–7% | Carbon Black |
| 1–40% | Ethylene glycol |
| 0–20% | N-Methylpyrrolidinone |
| 0.2–10% | Lomar D (Henkel) |
| 0–1.0% | Duponol (Sodium Lauryl Sulfate) |
| 0.01–1.0% | Dowicil 200 (Fungicide, Dow Chemical Co.) |
| Balance | distilled water |
| 1.2 micron filtration | |
| 4. 2–7% | Carbon Black |
| 1–45% | Ethyleneglycol |
| 0.2–10% | Daxad 19K (W. R. Grace) |
| 0–1.0% | Duponol (Sodium Lauryl Sulfate) |
| 0–0.2% | Dowicil 200 (Fungicide) |
| Balance is distilled water | |
| 1.2 micron filtration | |

An ammonium salt is used in the ink primarily to increase the coupling efficiency of a slow drying ink and the microwave generated from a microwave dryer. This will allow a slow drying ink imaged on plain paper to be heated up and dried quickly before a color ink can be printed next to it without causing intercolor bleeding. The use of a salt such as ammonium chloride in the ink and a microwave dryer can effectively avoid intercolor bleeding. 1.9% of ammonium chloride was used in the example. It is not necessary that it has to be that value. An ink comprising less than or equal to 1.9% (by weight) of ammonium salt will also works. In claim 41, it was modified to a range of 0.1–5% by weight of ammonium chloride. Ethylene glycol is a humectant in an ink jet ink to avoid clogging of the printhead nozzles. Also it does not cause feathering or poor image quality on a plain paper. This allows an ink jet ink to produce a high quality image on plain paper. Polyethyleneoxide is a jetting aid which can increase ink drop volume or drop mass which is needed to ensure good optical density for an image on plain paper. N-Methylpyrrolidinone is a good humectant and penetrant (help ink drying slightly faster but maintaining good print quality). It also help stabilize the pigment particles in an ink. The desired penetrant allows the pigment ink (e.g. carbon black ink) to dry a little faster without causing undesired feathering effect and poor image quality.

Benzyl alcohol is a penetrant (facilitate ink drying) for an ink. It should be used judiciously without sacrificing image quality. Excessive use of benzyl alcohol can cause poor image quality. Without the benzyl alcohol, ink will dry slowly thus increasing the chance of undesired intercolor bleeding. The slow-drying inks (with high surface tension which is greater than 40 dyne/cm) are designed to produce high image quality on plain papers. The use of slow-drying inks next to each other may lead to intercolor bleeding. The fast drying inks usually give poor image quality, however, they are used next to a slow drying ink to avoid intercolor bleeding. Butylcarbitol (BC) and cyclohexylpyrrolidinone (CHP) are good ink ingredients to facilitate drying and to reduce intercolor bleeding (particularly n Second Type Inks, with low surface tension, less than 40 dyne/cm).

In addition to these inks, there are also inks which are particularly conducive to microwave drying. In general, it has been found that the performance of such inks in this context is substantially improved by the addition of certain salts, which serve to adjust the conductivity of the ink to a desired optimal range. Such a salt must improve the conductivity and also be readily soluble in the solvent/humectant of the ink. For this purpose, one particularly effective type of salt is ammonium salts, and particularly $NH_4Cl$.

Further, with inks to be used with microwave drying, it is desired to design an ink with a controlled penetration, so that the liquid ink on the surface of the (typically uncoated paper) sheet will provide a suitable "cross section" upon which the radiation can act. Controlled ink penetration is typically accomplished by addition of a small molecule organic penetrant, and the preferred additives of this type include isopropanol or benzyl alcohol. These penetrants must be used judiciously, however, to balance the competing dangers of feathering (caused by insufficient penetration) and show-through (caused by too-aggressive penetration).

Listed below is the formula of the currently preferred slow-drying black ink suitable for microwave drying, as in the apparatus of the present invention. The following formula has been tested to have a surface tension of 44 dynes/cm and a conductivity of 26.4 millimho/cm:

| | |
|---|---|
| 6–20% | BASF X-34 (2–6% dye solids in ink) |
| 10–45% | Ethylene Glycol |
| 0.5–5% | Benzyl Alcohol (Baker Analyzed) |
| 0.1–5% | Ammonium Chloride (Aldrich) |
| 0.01–1.0% | polyethyleneoxide (M.W = 18.5K) |
| Balance | Water |

FAST-DRYING INKS

Black Ink:

| | |
|---|---|
| 1.5–8.0% | Food Black #2 (Bayscript) |
| 1–20% | 60/40 Butyl Carbitol/Glycerine |
| 0.1–4% | Cyclohexylpyrrolidinone (CHP) |
| 0.01–1.0% | Polyethyleneoxide (M.W = 18.5K) |
| 0–2% | Pluronic PE 6400 |
| Balance | Distilled Water |
| 1.2 micron filtration | |

Cyan Ink:

| | |
|---|---|
| 0.5–5.0% | Project Cyan (ICI) |
| 1–20% | 60/40 Butyl Carbitol, |
| 5–25% | Glycerine |
| 0.1–4% | Cyclohexylpyrrolidinone (CHP) |
| 0.01–1.0% | Polyethyleneoxide (M.W = 18.5K) |
| Balance | Distilled Water |
| 1.2 micron filtration | |

Magenta Ink:

| | |
|---|---|
| 0.5–8.0% | Project Magenta (ICI) |
| 1–20% | 60/40 Butyl Carbitol/Glycerine Solution |
| 0.1–4% | Cyclohexylpyrrolidinone (CHP) |
| 0.01–1.0% | Polyethyleneoxide (M.W = 18.5K) |
| Balance | Distilled Water |
| 1.2 micron filtration | |

Yellow Ink:

| | |
|---|---|
| 0.5–8.0% | Hoechst Yellow (Tartazine) |
| 1–20% | 60/40 Butyl Carbitol/Glycerine Solution |
| 0.1–4% | Cyclohexylpyrrolidinone (CHP) |
| 0.01–1.0% | Polyethyleneoxide (M.W = 18.5K) |
| Balance | Distilled Water |
| 1.2 micron filtration | |

It is, therefore, apparent that there has been provided in accordance with the present invention, an ink jet printer with inks and methods thereof that fully satisfies the aims and advantages of multicolor ink image printing without intercolor bleeding. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for printing a multicolor image on a sheet movable along a sheet path in a process direction, the apparatus comprising:

a. a first printhead mounted at a first location along the sheet path and containing a first type ink for printing a first portion of the image on the sheet, said first type ink having a surface tension greater than 40 dynes/cm at room temperature; and b. a set of secondary printheads mounted along the sheet path and separated a small gap from said first printhead, said set of secondary printheads each containing a secondary type ink for printing a secondary portion of the multicolor image on the sheet, and each said secondary type ink having a surface tension less than 40 dynes/cm at room temperature.

2. An ink jet printer for printing a multicolor image on a sheet movable along a sheet path in a process direction, the ink jet printer comprising:

a. a first full-width array printhead mounted at a first location along the sheet path and containing a first type black ink for printing a first portion of the image on the sheet, said first type black ink having a surface tension greater than 40 dynes/cm at room temperature; and b. a set of secondary printheads mounted along the sheet path and separated a small gap from said first full-width array printhead, said set of secondary printheads each containing a secondary type ink for printing a secondary portion of the multicolor image on the sheet, and each said secondary type ink having a surface tension less than 40 dynes/cm at room temperature.

3. The ink jet printer of claim 2, wherein said set of secondary printheads is mounted downstream of said first full-width array printhead relative to the process direction.

4. The ink jet printer of claim 2, wherein said first type ink comprises a slow drying ink having a room temperature drying time of greater than 1.0 second.

5. The ink jet printer of claim 2, wherein each said secondary type ink comprises a fast-drying ink having a room temperature drying time of less than 1.0 second.

6. The ink jet printer of claim 2, wherein each printhead of said set of secondary printheads comprises a full-width array printhead extending across a entire width of the movable sheet.

7. The ink jet printer of claim 2, wherein said set of of secondary printheads comprises a set of four printheads.

8. The ink jet printer of claim 2, including heating means located between said first full-width array printhead and said set of secondary printheads for heating a first black image printed on the sheet by said first full-width array printhead.

9. The ink jet printer of claim 7, wherein said set of four printheads comprises a printhead containing cyan ink, a printhead containing magenta ink, a printhead containing a second type black ink, and a printhead containing yellow ink.

10. The ink jet printer of claim 8, wherein said heating means comprises a microwave heating device for stimulating liquid molecules of said first type black ink to cause evaporation thereof.

11. The ink jet printer of claim 8, wherein said first type of ink comprises 6–20% BASF X-34, 30% Concentrated dye liquid, about 2–6% Pure dye mixture, 10–45% ethylene glycol, 1–5% Isopropanol, and 0.01–1.0% polyethyleneoxide by weight.

12. The ink jet printer of claim 8, wherein said first type of ink comprises 2–7% Carbon Black, 1–40% Ethylene glycol, 0–20% N-Methylpyrrolidinone, 0.2–10% Lomar D, 0–1% Sodium Lauryl Sulfate, and 0.01–1.0% Dowicil 200 by weight.

13. The ink jet printer of claim 8, wherein said first type of ink comprises 2–7% Carbon Black, 1–45% Ethyleneglycol, 0.2–1% Daxad 19K, and 0–1% Sodium Lauryl Sulfate by weight.

14. The ink jet printer of claim 8, wherein said first type black ink comprises 6–20% BASF X-34, 2–6% dye solids in ink, 0.5° 5% Benzyl Alcohol, 10–45% Ethylene glycol, 0.1–5% Ammonium Chloride, and 0.01–1.0% polyethylene oxide in amounts by weight.

15. The ink jet printer of claim 8, wherein said second type black ink comprises 1.5–8.0 % Food Black #2, 1–20% 60/40 Butyl Carbitol, 5–25% Glycerine, 0.1–4% Cyclohexylpyrrolidinone, and 0.01–1.0% polyethylene oxide in amounts by weight.

16. The ink jet printer of claim 8, wherein said second type cyan ink comprises 0.5–5% Project Cyan, 1–20% 60/40 Butyl Carbitol, 5–25% Glycerine, 0.1–4% Cyclohexylpyrrolidinone, and 0.01–1.0% polyethylene oxide, by weight.

17. The ink jet printer of claim 8, wherein said second type magenta ink comprises 0.5–8.0% Project Magenta, 1–20% 60/40 Butyl Carbitol, 5–25% Glycerine, 0.1–4% Cyclohexylpyrrolidinone, and 0.01–1.0% polyethylene oxide, by weight.

18. The ink jet printer of claim 8, wherein said second type yellow ink comprises 0.5–8.0% Hoechst Yellow, 1–20% 60/40 Butyl Carbitol, 5–25% Glycerine Solution, 0.1–4% Cyclohexyl pyrrolidinone, and 0.01–1.0% polyethylene oxide, by weight.

19. The ink jet printer of claim 8, wherein said first type black ink includes a mild penetrant isopropanol.

20. The ink jet printer of claim 8, wherein said first type black ink includes N-Methylpyrrolidinone for stabilizing ink pigment particles.

21. A method of printing, on an image receiving sheet, a high quality multiple color image having a high quality black ink portion abutting a color ink portion, the printing method comprising the steps of:
   a. printing the high quality black ink portion of the multiple-color image on a first spot on the receiving sheet using a slow-drying, first black ink; and
   b. printing the color ink portion of the multiple color image on a second spot on the receiving sheet abutting said first spot, such that said color ink portion is separated by a small gap along a line where said color portion otherwise would abut said high quality black ink portion.

22. The method of claim 21, including a step of applying heat to the printed high quality black ink portion prior to printing the color ink portion of the multiple color image.

23. The method of claim 22, wherein said color portion is printed such that said small gap has a width within a range of 2 mils to 15 mils.

24. The method of claim 22, wherein said printing steps include printing said high quality black ink portion and said color ink portion of the multiple color image pixel by pixel, and such that said small gap has a width within a range of 1 to 5 pixels.

25. The method of claim 24, wherein said step of printing said color ink portion comprises printing said color portion such that said small gap has a width of 3 pixels.

26. The method of claim 24, wherein said step of printing said color ink portion gapped from the black ink portion comprises printing said color portion partially and omitting to print pixels of the color ink portion of the multiple color image thereby forming said small gap.

27. A method of printing, on an image receiving sheet, a high quality multiple color image having a high quality black portion abutting a multicolor portion, the printing method comprising the steps of:
   a. printing the high quality black portion of the multiple color image using a slow-drying, first black ink;
   b. creating a small gap between the high quality black portion and the multicolor portion by using fast-drying color inks to print the multicolor portion spaced said small gap in the abutting area from the high quality black portion; and
   c. filling in said small gap by printing therein using a fast-drying second black ink.

28. The method of claim 27, wherein said step of printing the multicolor portion comprises printing selectively with color inks of cyan, magenta, yellow and said fast-drying, second black ink.

29. The method of claim 28, wherein said color ink of yellow is used last in said printing step.

30. The method of claim 28, wherein said color ink of magenta is printed before said ink of cyan in said printing step.

* * * * *